United States Patent
Von Viebahn et al.

[19]

[11] Patent Number: 6,054,937

[45] Date of Patent: *Apr. 25, 2000

[54] METHOD FOR REPRESENTING FLIGHT GUIDANCE INFORMATION

[75] Inventors: Harro Von Viebahn, Seeheim-Jugenheim; Christian Below, Frankfurt am Main; Kai Lindenberg, Darmstadt, all of Germany

[73] Assignee: VDO Luftfahrtgerate Werk GmbH, Frankfurt am Main, Germany

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/507,264

[22] PCT Filed: May 3, 1994

[86] PCT No.: PCT/DE94/00489

§ 371 Date: Aug. 18, 1995

§ 102(e) Date: Aug. 18, 1995

[87] PCT Pub. No.: WO94/25827

PCT Pub. Date: Nov. 10, 1994

[30] Foreign Application Priority Data

May 5, 1993 [DE] Germany .............................. 43 14 811

[51] Int. Cl.⁷ ...................................................... G08G 5/04
[52] U.S. Cl. .......................... 340/961; 340/973; 340/974; 342/29; 701/301
[58] Field of Search ..................................... 340/971, 972, 340/973, 974, 975, 976, 961, 980, 967, 968, 970, 977, 978, 979; 364/460, 461, 428, 439, 429, 430, 434; 342/29, 33; 701/300, 301, 120, 3, 9, 14, 15, 16

[56] References Cited

U.S. PATENT DOCUMENTS

| | | | |
|---|---|---|---|
| 3,784,969 | 1/1974 | Wilckens et al. | 340/972 |
| 4,247,843 | 1/1981 | Miller et al. | 340/973 |
| 4,835,537 | 5/1989 | Manion | 340/961 |
| 5,179,377 | 1/1993 | Hancock | 340/961 |
| 5,181,028 | 1/1993 | Sharpe et al. | 340/974 |
| 5,227,786 | 7/1993 | Hancock | 340/961 |
| 5,289,185 | 2/1994 | Ramier et al. | 340/972 |
| 5,296,854 | 3/1994 | Hamilton et al. | 340/973 |
| 5,313,201 | 5/1994 | Ryan | 340/961 |
| 5,420,582 | 5/1995 | Kubbat et al. | 340/974 |

FOREIGN PATENT DOCUMENTS

| | | |
|---|---|---|
| 0396071 | 11/1990 | European Pat. Off. . |
| 0418558 | 3/1991 | European Pat. Off. . |
| 1196872 | 7/1965 | Germany . |
| 2107059 | 4/1983 | United Kingdom . |

*Primary Examiner*—Brent A. Swarthout
*Attorney, Agent, or Firm*—Milde, Hoffberg & Macklin, LLP

[57] ABSTRACT

According to a method for representing information for guiding the flight of an aircraft, the airspace with at least one horizon and the precalculated flight path of the aircraft are three-dimensionally represented by means of an image display device and means for positioning one or several aircraft therein are provided. The aircraft symbols are merged into the representation of the airspace. Preferably, the other aircraft are each represented by a symbol corresponding to their position in the airspace and by at least one line represented in perspective from the point of view of the aircraft concerned.

24 Claims, 3 Drawing Sheets

METHOD FOR REPRESENTING FLIGHT GUIDANCE INFORMATION

BACKGROUND OF THE INVENTION

This invention relates to method of representing flight guidance information of an aircraft, wherein a spatial representation of the airspace, comprising at least one horizon and the precalculated flight path of the aircraft, is effected with the aid of an image reproduction device.

A method such as this has become known through the published German Patent Application DE 39 30 862 A1, its corresponding European Patent No. 0,418,558 and its corresponding U.S. Pat. No. 5,420,582, which is incorporated herein by reference. It improves the procedure of imparting information by means of an image which is subsequently experienced by natural observation habits, so that the mental load on the pilot is also reduced. Moreover, the symbolism used constitutes a complete item of information which enables the position and movement in space to be monitored and predetermined flight paths and short-term navigation to be adhered to. Qualitative information, determined by the manner of the display, appears in the foreground, and is supplemented by the necessary quantitative indications. The pilot's task is made easier by a summary of the information relevant to the flight phase within an overall image which is of favorable ergonomic form.

In addition, this known method permits pre-control of the aircraft, wherein the consequences of a control input are directly identifiable. Possible unwanted developments—for example stalling at the take off—can be identified and prevented before they actually occur. The pilot's time for reaction is prolonged and safety is thereby increased.

Further efforts to increase flight safety consist of aircraft situated in the air transmitting their position and their course by radio so that other aircraft can receive this information. Provision is therefore also made in the known method for the estimated flight path of another aircraft to be superimposed by means of a plurality of symbols. On the one hand this assumes that the other aircraft is equipped with a device which calculates the estimated flight path as does the first aircraft, according to the U.S. Pat. No. 5,420,582. On the other hand a symbol must be provided which indicates the other aircraft itself is not provided in the known method. Moreover it is only possible to precalculate the flight path with any certainty for a relatively short period of time or for a corresponding distance. However, if the other aircraft is situated relatively far away, not only is its correct perspective representation very small but that of this short, precalculated flight path is also very small.

Representations of other aircraft and of hazards by means of symbols are known from the U.S. Pat. No. 5,181,028 and the European Patent No. 0 396 071 A2. Their size is not determined by the position of the other aircraft in real space, however.

SUMMARY OF THE INVENTION

This object as well as other objects which will apparent from the discussion that follows, are achieved according to the present invention, by providing means for transmitting the position of one or more other aircraft and symbols representing these aircraft on the representation of the airspace, such that the other aircraft are each represented by a symbol corresponding to their position in the airspace and by at least one strip, and wherein the at least one strip commences at the symbol for the other aircraft, is aligned corresponding to the course of the other aircraft and is displayed in perspective from the viewpoint of the first aircraft. The principal object of the present invention is to display the information relating thereto in such a manner that the pilot immediately identifies the position and the course of other aircraft, even if the symbols of the other aircraft are displayed smaller on the screen.

By means of this method according to the invention the position and course of another aircraft can be identified with certainty even if the other aircraft is situated at a greater distance and the symbol itself is therefore displayed smaller on the screen. A further embodiment of the invention provides for the strip to have a predetermined length, wherein the at least one strip is preferably displayed in transparent form.

The length of the strips may be 5 km to 10 km, for example. The strips may be aligned according to both the heading and the course above ground, depending on what is transmitted by the other aircraft. Since where the other aircraft is estimated to be flying to is intrinsically of interest, the alignment may be set according to the course above ground.

According to another development of the invention, even aircraft which are not yet visible on screen can be indicated in that the at least one strip is also displayed when the strip, but not the associated other aircraft, is situated in the displayed airspace.

A particularly certain identification of course and position is made possible if two strips are displayed for every other aircraft, which strips radiate upwards and downwards from the symbol of the other aircraft at an acute angle in each case. A reasonable angle between the upper and lower strips is 5° for example.

In another development of the method according to the invention, in which additional numerical indications of the pitch angle are superimposed, wherein the numerical indications, preferably two, are displayed in an imaginary extension of the plane of the aircraft, provision is made for the indications to be transparent. In this respect, provision is preferably made for the indications to be figures inside a frame, wherein the respective background (sky, ground) is visible in the part of the frame which is not covered by the figures.

By means of this embodiment of the invention, a transition from a positive to a negative pitch angle and vice versa is particularly clearly indicated in that the marker indicating the pitch angle also changes its immediate background color—namely from the color of the sky to the color of the ground.

In another development of the invention, provision is made for the area above the horizon, which is preferably displayed blue, to be subdivided into stripes of different hue which run parallel to the horizon, and a predetermined pitch angle corresponds to each stripe. In this respect it has proved to be advantageous if the predetermined pitch angle is 10°. By means of this embodiment of the invention, the banking of the aircraft is displayed, even at large pitch angles, if the ground or the horizon in particular is no longer visible or is only partly visible on the screen. In addition, the change in color imparts further information on the magnitude of the pitch angle. In particular, this becomes clear in another development of the invention, in which a warning color appears above a predetermined maximum pitch angle. This further form of the invention results in a clear warning before the aircraft stalls.

For a full understanding of the present invention, reference should now be made to the following detailed descrip-

DESCRIPTION OF THE PREFERRED EMBODIMENTS

Figure 1:
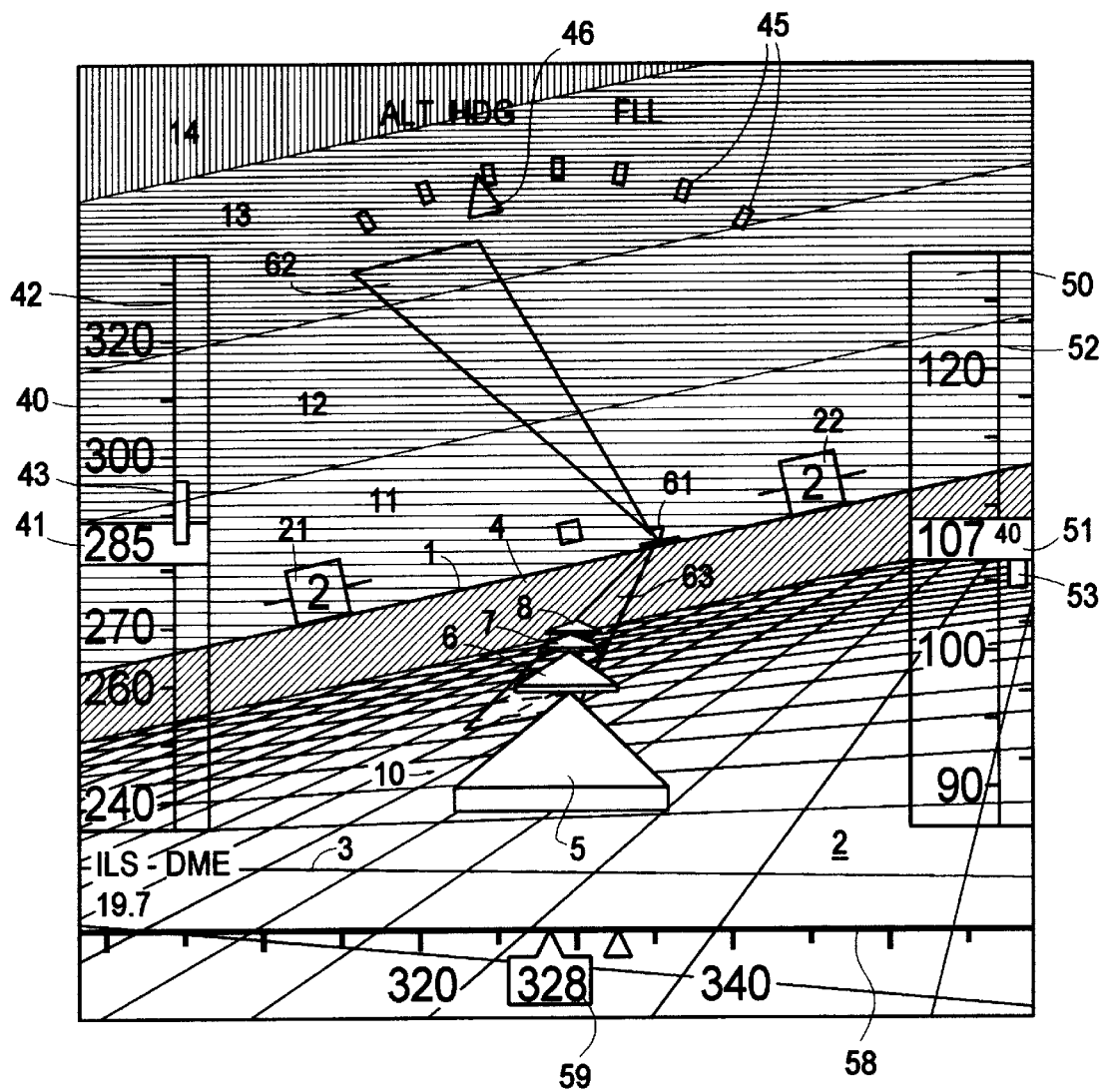
FIG. 1 is an illustration of a screen image display according to the invention wherein the first aircraft intersects the course of another aircraft which is visible on the horizon.
Figure 2:
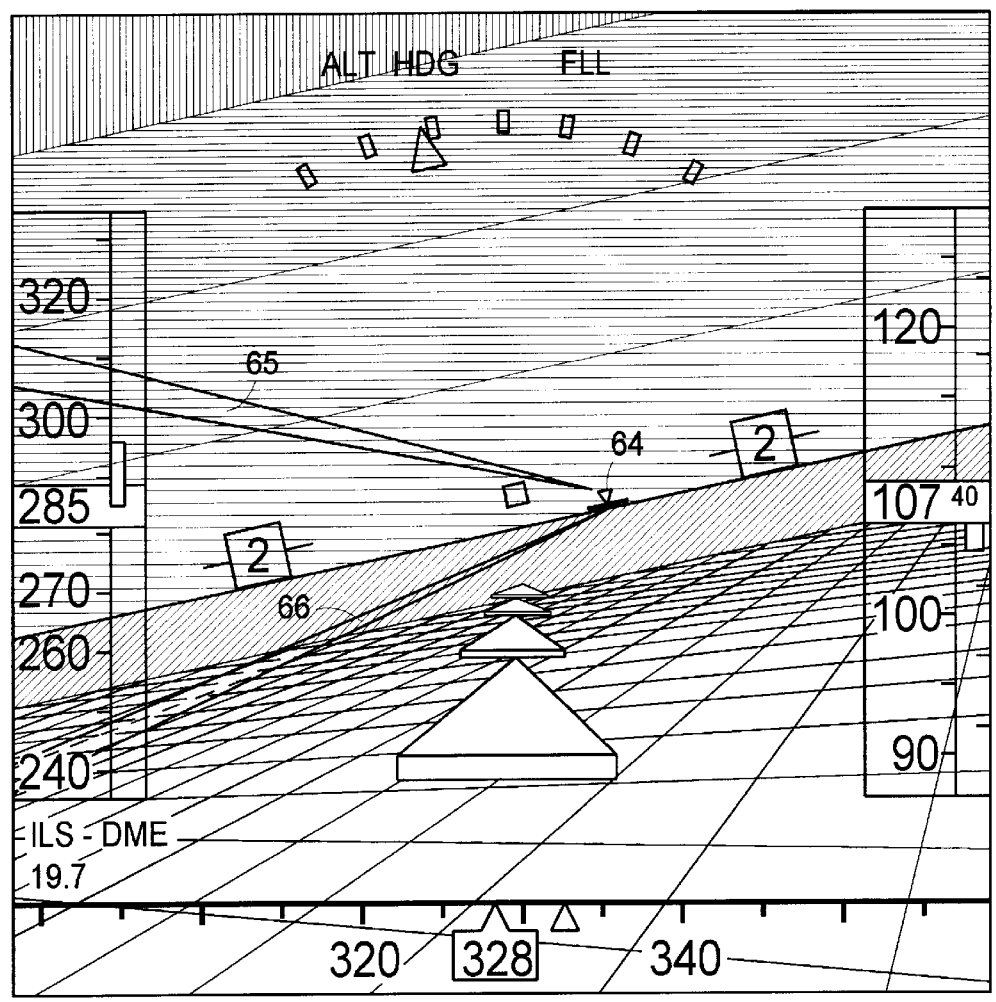
FIG. 2 is an illustration of a screen image display according to the invention wherein the first aircraft apparently avoids the path of another aircraft which is visible on the horizon.
Figure 3:
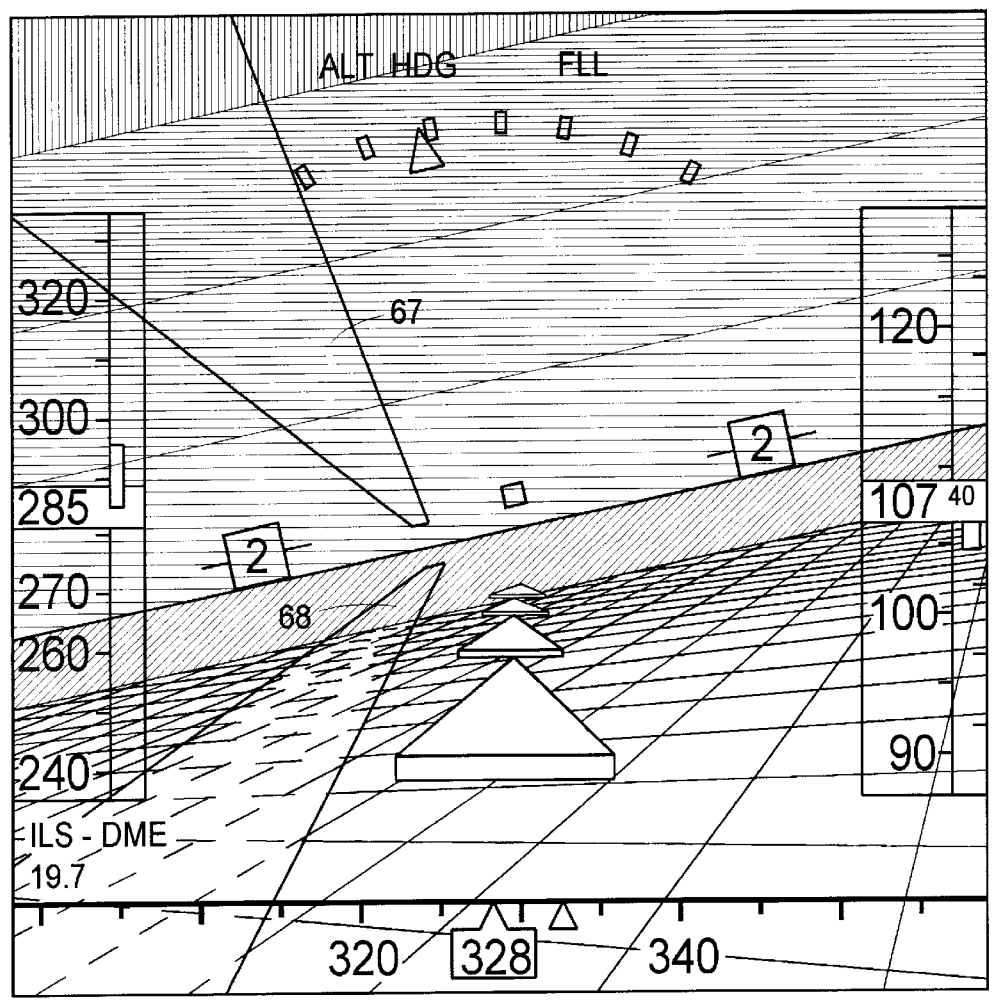
FIG. 3 is an illustration of a screen image display according to the invention wherein the first aircraft is flying on a similar course to another aircraft which is behind the first aircraft.

FIGS. 1 to 3 illustrate screen images in various flight situations, in order to elucidate the method according to the invention. Devices for implementing the known method cited at the outset have already been described in the aforementioned U.S. Pat. No. 5,420,582. Since these devices are also suitable for implementing the method according to the present invention, no further description will be given herein.

The screen image is preferably colored. However in FIGS. 1 to 3 the screen images are reproduced as monochrome drawings. Where areas of different hue are of particular importance to the invention, these are represented by hatchings of different types.

FIG. 1 shows a screen image obtained while the aircraft is flying with an inclination (bank) to the right. The horizon 1 accordingly has a slanting position. In the example illustrated the ground (earth's surface) 2 is flat and is covered by a grid 3 which is aligned in a north-south direction, towards the magnetic poles for example. The distance between the grid lines is preset and in a preferred embodiment of the invention can be switched between one nautical mile and one geodetic minute of arc.

Since in the perspective representation the number of grid lines becomes very large in the region of the horizon, it would be necessary without further measures to calculate very many grid lines, which could no longer be represented anyway for reasons of resolution. No more lines are therefore calculated and represented in a surface region 4 in front of the horizon, but this surface region 4 is provided with a color which is matched to the color effect produced by the color of the ground and by the lines of the grid becoming closer.

In the exemplary embodiments illustrated the precalculated flight path is represented by triangular segments 5 to 8. In this respect, the individual segments 5 to 8 represent the precalculated position, the altitude, the course and the position of the aircraft, respectively. The sum of the segment-shaped symbols 5 to 8, i.e. the total displayed part of the precalculated flight path, is hereinafter called the predictor 10.

In addition to this information, the pilot receives an impression of the speed, in that the extension of the individual symbols 5 to 8 in the direction of flight and thus the total length of the predictor 10 depends on the speed. Another item of speed information is imparted by the color, in such a way that in a non-critical speed range the surfaces of the symbols have a first color, green for example, whereas when approaching inadmissibly high or inadmissibly low speeds the color of those symbols for which speeds of this type are precalculated becomes an appropriate warning color, red and orange for example.

Since where the aircraft is flying to is ultimately of interest to the pilot, the predictor 10 is aligned overall in accordance with the precalculated course above ground. However, since the heading also constitutes an important item of information for the pilot—particularly when landing with a side wind—the first symbol 5 of the predictor 10 is aligned in accordance with the heading.

The fact that the symbols 5 to 8 are not represented as areas but as segments with a predetermined thickness leads to a significant improvement in the spatial impression. In one embodiment which has been implemented the visible edges are kept dark green.

The sky is represented as various stripes parallel to the horizon, each of which is a different hue. In this connection, the height of each stripe preferably corresponds to a pitch angle of 10°. In imitation of nature, the sky is displayed in blue, and starting from a pale bright blue at the horizon the blue becomes darker or more intense with increasing height. Four stripes 11 to 14 are visible in the Figures.

Two markers 21, 22 are provided for indicating the pitch angle. These indicate the pitch angle firstly by their position in relation to the horizon and secondly numerically.

The markers 21, 22 are transparent, so that the background is visible through the markers. Particularly in the range of smaller pitch angles, when the horizon 1 passes through the markers 21, 22, a change in sign of the pitch angle is easily identifiable by a color change inside the markers.

Other indications which are visible on the screen image are described below. These are visible in FIGS. 1 to 3, but for sake of clarity are only provided with reference numerals in FIG. 1. A region 40 at the left edge of the screen image is provided for the speed. The speed is numerically indicated in knots in field 41. A scale 42 which runs vertically is displaced depending on the speed in such a way that the numerical indications are shown above the corresponding point on the scale. A bar type marker 43 provides an indication of the trend in speed, which is positive in the screen image illustrated.

Together with a pointer 46, the markers 45 superimposed on the top part of the screen image constitute an indication of the roll angle. A row of alphanumeric characters which comprise information on the autopilot is provided above the roll angle indicator.

Flight altitude information is displayed in a region 50 at the right-hand edge of the screen image. The respective flight altitude is indicated numerically in feet in a central field 51. A scale 52 runs vertically, apparently behind field 51, and moves depending on the flight altitude in such a way that the numerical indication appears in front of the corresponding point on the scale. The length of a bar type marker 53 which starts from field 51 represents the variometer indication. A descent of the aircraft is indicated in the situation illustrated.

A horizontally extending scale 58 for indicating the course is provided in the bottom region of the screen image. As for the altitude and speed indications, this scale also has a stationary field 59 in which the heading is numerically indicated. The scale 58 is moved horizontally in an appropriate manner for this purpose.

In the situation illustrated in FIG. 1 another aircraft 61 is indicated on the horizon 1. It can be identified on the strips 62, 63 that the other aircraft 61 is approaching obliquely from the front opposite to the course of the first aircraft. The two strips 62, 63 are of transparent construction so that the sky and the ground appear through them. The predictor 10 is situated above the lower strip 63, from which it can be recognized that the other aircraft 61 is not flying too much higher than the first aircraft. However, this conclusion is only possible in association with the predetermined length of the strips 62, 63.

FIG. 2 illustrates another aircraft 64 which has a course which forms a larger angle with the course of the first aircraft. This can be recognized in that the strips 65, 66 each appear narrower to the observer and form an angle which is apparently smaller than that in the situation shown in FIG. 1. In addition, the other aircraft 64 will leave the "angle of view" within a period shorter than that which is necessary in order to fly along the predetermined length of the strips 65, 66.

In the situation shown in FIG. 3 another aircraft is flying behind the first aircraft with a course which approximately corresponds to the course of the first aircraft, the strips 67, 68 of which do not meet in the direction of flying. Despite this, they become narrower with increasing distance and apparently become closer to each other, on account of the spatial representation.

There has thus been shown and described a novel method of representing flight guidance information which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

We claim:

1. In a method of representing flight guidance information of a host aircraft from the vantage point of the host aircraft, wherein a spatial representation of the airspace, comprising at least one horizon and the precalculated flight path of the host aircraft, is produced with the aid of a graphic image generating device and displayed on an image display, the improvement comprising means for transmitting the position of one or more other aircraft to the host aircraft, and wherein symbols representing these other aircraft are superimposed on the representation of the airspace on the display, wherein the other aircraft are each represented by a symbol corresponding to their position in the airspace and by two straight strips, and wherein each of the two strips starts at the symbol for the other aircraft, extends forward in a direction corresponding to the actual course of the other aircraft and is displayed on the display in perspective from the viewpoint of the host aircraft, said two strips extending upward and downward from the symbol of the other aircraft with an acute angle between them.

2. A method according to claim 1, wherein the at least one strip is displayed in transparent form.

3. The method according to claim 1, wherein two strips are displayed for each other aircraft, which strips radiate upwards and downwards from the symbol of the other aircraft at an acute angle in each case.

4. The method as claimed in claim 1, wherein additional numerical indications of the pitch angle are superimposed in an imaginary extension of the plane of the host aircraft in the airspace, the indications being figures inside a frame, wherein that part of the area encompassed within the frame which is not covered by the figures is transparent.

5. The method according to claim 4, wherein the indications are figures inside a frame, and wherein 2 background of sky or ground is visible in the part of the frame which is not covered by the figures.

6. The method defined in claim 4, wherein there are two numerical indications of the pitch angle.

7. The method according to claim 1, wherein the area above the horizon, which is displayed blue, is subdivided into strips of different hue which run parallel to the horizon, and that a predetermined range of pitch angles corresponds to each strip.

8. The method according to claim 7, wherein a predetermined pitch angle range is 10°.

9. The method according to claim 7, wherein a warning is exhibited when a predetermined maximum pitch angle is exceeded.

10. The method according to claim 1, wherein each of the two strips has a predetermined length.

11. In a method of representing flight guidance information of a host aircraft, wherein a spatial representation of the airspace, comprising at least one horizon and the precalculated flight path of the host aircraft, is produced with the aid of a graphic image generating device and displayed on an image display, the improvement comprising means for transmitting the position of one or more other aircraft to the host aircraft, and wherein symbols representing these other aircraft are superimposed on the representation of the airspace on the display, wherein the other aircraft are each represented by a symbol corresponding to their position in the airspace and by at least one straight strip, wherein the at least one strip starts at the symbol for the other aircraft, extends forward in a direction corresponding to the actual course of the other aircraft and is displayed on the display in perspective from the viewpoint of the host aircraft, and wherein additional numerical indications of the pitch angle are superimposed, in an imaginary extension of the plane of the host aircraft in the airspace, the indications being figures inside a frame, wherein that part of the area encompassed within the frame which is not covered by the figures is transparent.

12. The method according to claim 11, wherein the indications are figures inside a frame, and wherein a background of sky or ground is visible in the part of the frame which is not covered by the figures.

13. The method defined in claim 11, wherein there are two numerical indications of the pitch angle.

14. The method according to claim 11, wherein the at least one strip has a predetermined length.

15. The method according to claim 11, wherein the at least one strip is displayed in transparent form.

16. The method according to claim 11, wherein the at least one strip is also displayed when the strip, but not the associated other aircraft, is situated in the displayed airspace.

17. The method according to claim 11, wherein two strips are displayed for each other aircraft, which strips radiate upwards and downwards from the symbol of the other aircraft with an acute angle between them.

18. In a method of representing flight guidance information of a host aircraft, wherein a spatial representation of the airspace, comprising at least one horizon and the precalculated flight path of the host aircraft, is produced with the aid of a graphic image generating device and displayed on an image display, the improvement comprising means for transmitting the position of one or more other aircraft to the host aircraft, and wherein symbols representing these other aircraft are superimposed on the representation of the airspace on the display, wherein the other aircraft are each represented by a symbol corresponding to their position in the airspace and by at least one straight strip, wherein the at least one strip starts at the symbol for the other aircraft, extends forward in a direction corresponding to the actual course of the other aircraft and is displayed on the display in perspective from the viewpoint of the host aircraft, and wherein the area above the horizon which is displayed blue, is subdivided into stripes of different hue which run parallel to the horizon, and that a predetermined range of pitch angles corresponds to each stripe.

19. The method according to claim 18, wherein a predetermined pitch angle range is 10°.

20. The method according to claim 18, wherein a warning is exhibited when a predetermined maximum pitch angle is exceeded.

21. The method according to claim 18, wherein the at least one strip has a predetermined length.

22. A method according to claim 18, wherein the at least one strip is displayed in transparent form.

23. The method according to claim 18, wherein the at least one strip is also displayed when the strip, but not the associated other aircraft, is situated in the displayed airspace.

24. The method according to claim 18, wherein two strips are displayed for each other aircraft, which strips radiate upwards and downwards from the symbol of the other aircraft with an acute angle between them.

* * * * *